United States Patent
Chess et al.

(10) Patent No.: US 8,082,299 B2
(45) Date of Patent: *Dec. 20, 2011

(54) METHODS AND SYSTEMS OF CLIENT-SIDE CACHING OF PAGES WITH CHANGING CONTENT

(75) Inventors: Brian Chess, San Francisco, CA (US); Evan Goldberg, Woodside, CA (US); William Ellery Bailey, Palo Alto, CA (US)

(73) Assignee: NetSuite Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/134,161

(22) Filed: May 31, 2011

(65) Prior Publication Data
US 2011/0238746 A1    Sep. 29, 2011

Related U.S. Application Data

(63) Continuation of application No. 10/071,496, filed on Mar. 1, 2002, now Pat. No. 7,970,816.

(51) Int. Cl.
*G06F 15/16*    (2006.01)
(52) U.S. Cl. ......... 709/203; 709/217; 709/219; 709/227
(58) Field of Classification Search ......... 709/200–203, 709/217–230, 231
See application file for complete search history.

(56) References Cited

U.S. PATENT DOCUMENTS

| 5,774,670 A | 6/1998 | Montulll |
| 5,821,927 A | 10/1998 | Gong |
| 5,842,216 A | 11/1998 | Anderson et al. |
| 6,012,052 A | 1/2000 | Altschuler et al. |

(Continued)

FOREIGN PATENT DOCUMENTS

WO    WO 01/11488 A2    2/2001

(Continued)

OTHER PUBLICATIONS

Persistent Client State HTTP Cookies, Netscape Support Documentation, Copyrighted 1999, pp. 1-5.

*Primary Examiner* — Moustafa M Meky
(74) *Attorney, Agent, or Firm* — Robert Moll

(57) ABSTRACT

The present invention relates to Internet based and web applications and the need to reduce page latency and bandwidth usage. The invention can achieve these goals by making use of the cache built in to standard web browsers. In one embodiment, the invention provides that a web application user will use their browser to request a page from the application web server, which responds with a small page that includes a script. The script appends a previously established cookie value to the URL originally requested and the browser then re-requests the URL with the appended cookie value. (The server computes the cookie value based on the last modified time of the data used to generate the page.) If the most recent version of the page is in the browser cache, the browser gets a cache hit, which means the page is retrieved from browser cache rather than from the server, rapidly displaying the page to the user. If, on the other hand, there is only an older version of the page in the browser cache, there is a cache miss (because the rewritten URL will not match any URL in the cache) and the browser will send the request to the server to retrieve the most recent version of the page.

22 Claims, 5 Drawing Sheets

U.S. PATENT DOCUMENTS

| | | |
|---|---|---|
| 6,026,413 A | 2/2000 | Challenger |
| 6,026,474 A | 2/2000 | Carter et al. |
| 6,038,598 A | 3/2000 | Danneels |
| 6,157,930 A | 12/2000 | Ballard et al. |
| 6,178,461 B1 | 1/2001 | Chan et al. |
| 6,225,995 B1 | 5/2001 | Jacobs et al. |
| 6,226,642 B1 | 5/2001 | Beranek et al. |
| 6,233,606 B1 | 5/2001 | Dujari |
| 6,236,661 B1 | 5/2001 | Ballard |
| 6,327,608 B1 | 12/2001 | Dillingham |
| 6,366,947 B1 | 4/2002 | Kavner |
| 6,434,628 B1 | 8/2002 | Bowman-Amuah |
| 6,510,439 B1 | 1/2003 | Rangarajan et al. |
| 6,757,705 B1 | 6/2004 | Pardikar et al. |
| 6,785,769 B1 | 8/2004 | Jacobs et al. |
| 6,792,459 B2 | 9/2004 | Elnozahy et al. |
| 6,834,294 B1 | 12/2004 | Katz |
| 7,269,784 B1 * | 9/2007 | Kasriel et al. .................. 715/205 |
| 7,289,964 B1 | 10/2007 | Bowman-Amuah |
| 7,970,816 B2 * | 6/2011 | Chess et al. .................... 709/203 |
| 2002/0032701 A1 | 3/2002 | Gao et al. |

FOREIGN PATENT DOCUMENTS

| | | |
|---|---|---|
| WO | WO 01/11502 A2 | 2/2001 |
| WO | WO 01/11503 A2 | 2/2001 |
| WO | WO 02/05126 A2 | 1/2002 |

* cited by examiner

METHODS AND SYSTEMS OF CLIENT-SIDE CACHING OF PAGES WITH CHANGING CONTENT

This application is a continuation of U.S. application Ser. No. 10/071,496, Client-Side Caching of Pages with Changing Content, filed on Mar. 1, 2002 now U.S. Pat. No. 7,970,816, which is incorporated by reference herein.

BACKGROUND

The invention relates to client-side caching of pages used to improve the performance of Internet-based or web applications.

Desktop software is typically maintained on the hard drive of PCs. This creates complexity for businesses during upgrades and maintenance. When desktop software is used in the client-server environment, it is costly to deploy and maintain because the software is decentralized. Desktop software also scatters the information, because each PC acts as a separate database, leading to duplication of effort and inefficiency. After several upgrades of PC software desktop applications, IT personnel may even find it difficult to keep track of all of the versions running on the network. Businesses would benefit if they did not need to upgrade, maintain and support desktop software.

The Internet permits delivery of applications as software services. See Stevens, *TCP/IP Illustrated*, Vol. 1, which is incorporated by reference. Internet-based applications can run on centralized servers rather than locally, which helps tremendously in supporting upgrades, security, backups and network administration. Businesses can access globally available applications without having to install or maintain them.

A web application is an Internet-based application that uses protocols of the World Wide Web such as the Hypertext Transfer Protocol, or HTTP. HTTP specifies how a client, such as a web browser, requests pages, data and services from servers, and how servers respond to these requests. Wong, *HTTP Pocket Reference* (2000) describing HTTP is incorporated by reference.

A web application permits access with a client such as a web browser, a computer having input, output, memory, datapath, and control, and an Internet connection. Users, businesses, customers, and suppliers can access the web application anywhere and at any time. For example, an employee on a business trip can review accounting, sales or customer information, and upload or download data all before returning home.

For users with slow connections to the Internet, web applications may appear to run more slowly than desktop applications. To address this problem, known as page latency, web applications can store pages in the client's browser cache to avoid retrieving it from the server. The cached pages will display quickly and the server will not need to service as many requests. However, the browser must know when a page has changed at the server so the browser does not retrieve an out-of-date page from the browser cache.

For example, a web server that delivers up a daily TV schedule can set the "expires" HTTP header on all of the TV schedule pages to be midnight. If a user navigates to the TV schedule page more than once on the same day, the browser doesn't need to ask the web site for a new page; it will simply display the page stored in its cache. At midnight the browser will expire the old TV schedule page from the cache, and subsequent requests for the page will cause the browser to once again request the page from the web server. However, if the server changes the TV schedule page in the middle of the day, a person returning to the web page after the change will see a cached page, which is out-of-date.

Caching using the expires header is difficult for a web application because the application's pages may change frequently. For example, in the case of a financial management application, the server may need to refresh all the pages when the user changes the background color, but only banking-related pages when the user updates their bank balance.

A browser can use the If-Modified-Since header of HTTP along with the GET method used to retrieve web pages. When using this header, the browser requests that the server send the page only if the page has been modified since the time specified in the header. If the page was modified, the server will return the page. If not, the server will send the response code of 304, meaning that the page was not modified since the specified time and the client should use the cached version. On a slow Internet connection and with a busy server, it might take several seconds to get the response code of 304, which does not solve the page latency problem. It would be better if the client did not have to send a request to the server in order to know whether or not the page in the cache is up-to-date. In that case, the cached page will load almost instantly even if the user's connection to the Internet is slow.

SUMMARY OF THE INVENTION

The invention relates to client-side caching. In an embodiment, the invention provides a method whereby the client issues a request for a page, entity, or document (i.e., resource) to a server, which responds with a cache control object such as a cookie and script. The cookie value represents the last version of the resource. The script appends the cookie value to the original request and re-requests the resource with the cookie value appended. If the most recent version of the page is in the client cache, the resource is retrieved from client cache rather than from the server. If, on the other hand, there is only an older version of the resource in the client cache, the client will send the request to the server to retrieve the most recent version.

In another embodiment, the invention provides a server, which receives a client request, updates a database, and determines if one or more cookies are required for cache control, referred to in some places as cache control cookies. If not, the server generates a response and sends the response to the client. If cookies are required, the server determines the cookie values. In one embodiment, the server sets a cookie value by determining the last modified time for the data associated with the page class. Each cookie value then becomes last modified time for the data associated with the page class. This will ensure that a change in the data for a given page class is reflected in all the pages in the class. Then the server sends a response to the client including the cookies and the content.

In another embodiment, the invention provides a server, which receives a client request, reviews the extension of the requested page to determine the run time environment, loads the run time environment, updates a database with information from the client request, and determines if one or more cache control cookies are required. If not, the server generates a response and sends the response to the client. If cookies are required, the server determines the cookie values for cache control. In one embodiment, the server sets a cookie value by determining the last modified time for the data associated with the page class.

Each cookie value then becomes the last modified time for the data associated with the page class. This will ensure that a change in the data for a given page class is reflected in all the pages in the class. Then the server sends a response to the client including the cookies and the content.

In alternative embodiments, a cache control object replaces the cookie, and/or Internet or network protocols replace HTTP as the communication standards between the server and client to implement the invention.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is best determined by reference to the claims.

Figure 1:
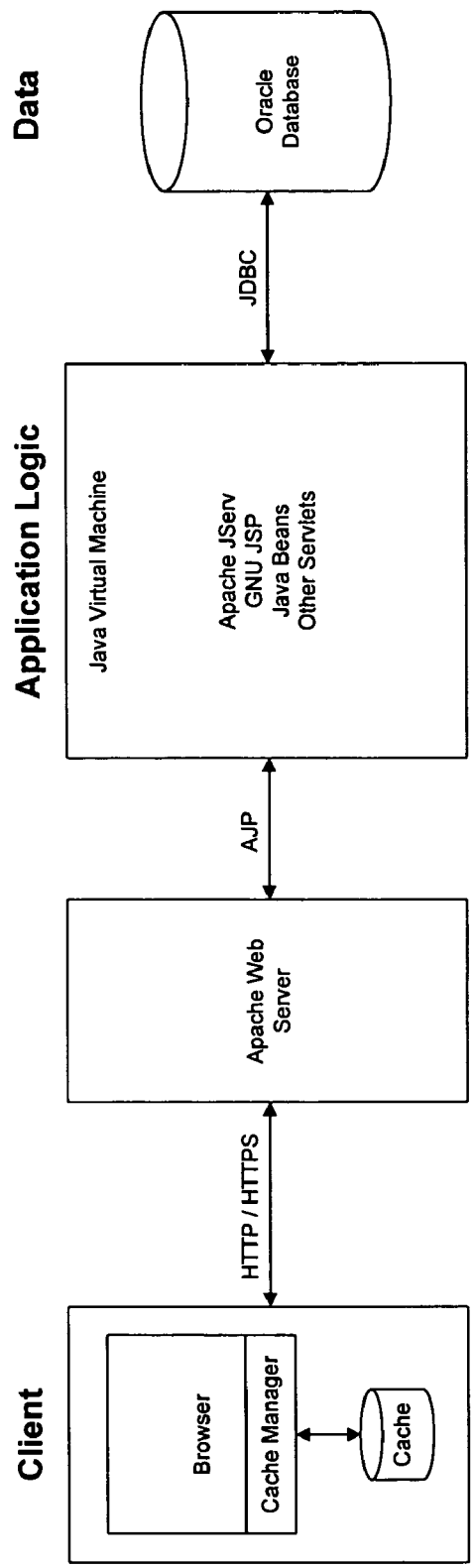
FIG. 1 shows an architecture suitable for a web application.

FIG. 1 is a diagram of a web application architecture that can be used to implement the invention. A web application can be implemented using software components such as a web server, an application server, and a database. The web application provider may have dozens of computers running each component in order to service a large number of simultaneous users. The provider may also dedicate some of these components to specialized tasks like server-to-server data exchange. For simplicity, FIG. 1 shows a diagram with a Web server, an application server, and a database. It is not essential to the invention that the components run on a particular operating system and hardware platform. Thus, it could be implemented using Linux, Windows, or Unix on one or more (e.g., a cluster) compatible computer(s) using Intel, AMD, and/or Sun microprocessors.

The most common sources of HTTP requests are web browsers like Microsoft's Internet Explorer or Netscape's Navigator. As shown in FIG. 1, the client includes a browser with a cache manager and a cache for storing and retrieving files, pages, documents, and information locally. In the illustrated embodiment the browser has a cache manager and cache.

The purpose of the web server is to listen for and accept requests and generate responses using HTTP. The Apache web server packaged with most Linux operating system distributions is suitable because of its reliability, security, flexibility, ease of use, cost, and availability for multiple platforms. Wainwright, *Professional Apache* (1999) describes one Web server and how to configure it, and is incorporated by reference. However, it is not essential that the present invention use Apache. It could be implemented using a variety of web servers including those sold by Oracle, Microsoft, IBM, or Netscape.

The web server and the application server are dedicated to servicing requests from web browsers. If a web browser requests a static object, for example, a Hypertext Markup Language (HTML) page, a web server can fulfill the request itself by reading the response directly out of the file storage system. If, on the other hand, servicing the request requires dynamically generated or personalized content, the web server must pass the request to a more specialized piece of software like an application server such as Apache JServ or the Oracle Application Server. The application server can generate a response and send it back to the web server, and the web server will in turn forward the response back to the requesting client.

As the name suggests, the purpose of the application server is to implement all of the customized logic that defines the application. Since creating that logic is the job of the provider, an application server may come with only limited and generic predefined functionality. Apache JServ includes software components, written in the C and Java languages, which communicate using a protocol such as Apache JServe Protocol (AJP). Because it is a Java application, Apache JServ runs inside a Java Virtual Machine (JVM). *The Java Programming Language*, third edition (2000) and Java In a Nutshell (1999) and http://java.sun.com describe Java and are incorporated by reference. A person of ordinary skill will know from review of this specification how to implement servlets, JSPs, Java objects, and other components that comprise the applications.

A Java program that accepts an HTTP request and produces an HTTP response is called a Java servlet or simply a servlet. *Professional Java Server Programming* (1999) and Hall, *Core Servlets and JavaServer Pages* (2000) describing server side programming including the creation of servlets, Java Server Pages, Java Beans, and other server-side technologies is incorporated by reference. An implementation of Java Servlet and JavaServer Pages technologies can be downloaded from http://java.sun.com/products/jsp/tomcat/. The invention can also use a servlet named GNU JSP to implement the JavaServer Page standard. A JavaServer Page (JSP) combines a markup language, such as HTML or XML, with Java code to produce a dynamic Web page. Unless otherwise noted, where reference is made to the application server performing an action related to dynamic pages that action can be carried out by a Java servlet.

The invention also may use Java objects that persist over multiple HTTP requests. These objects can be used to store session information like a user's identity so that the user does not have to provide authentication information every time they request a new page.

Useful applications allow users to save their work and resume hours, days, or weeks later. A relational database like Oracle8i is well suited to the task of providing reliable persistent data storage although other enterprise databases may be used. The Java DataBase Connection (JDBC) protocol allows Java applications (e.g., servlets) to communicate with a database. Preferably, the Java driver is type 4, an all-Java driver issuing requests directly to the database, which does not require additional libraries or middleware to install. Many major database vendors provide type 4 JDBC drivers for their databases.

Figure 2:
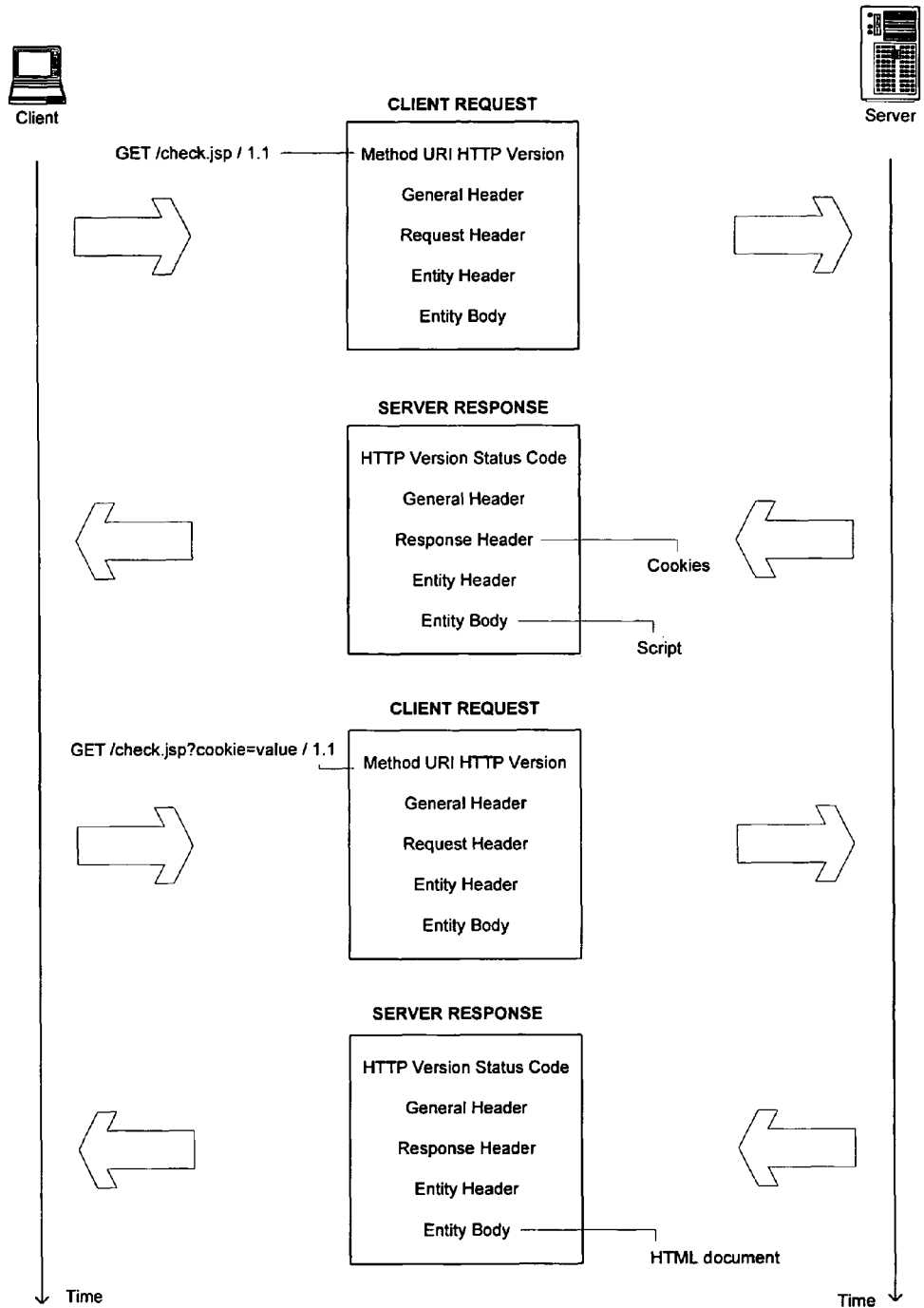
FIG. 2 shows the general structure of an HTTP transaction including a client request and a server response.

FIG. 2 illustrates HTTP transactions between a client and a server, which can be used to implement the invention.

HTTP requests have the following components:

The first line "Method URI HTTP Version" indicates what method to apply, what entity, document, or page to apply it to, and the version of HTTP the client is using. A Uniform Resource Identifier (URI) is the unique location of a resource on the Internet, such as a file, email address, program, or service. The most common type of URI is a Uniform Resource Locator (URL), which could indicate the location of a page or map to a program.

The General Headers indicate general information such as the current time in Greenwich Mean Time (GMT), and whether the connection should be maintained in order to process further requests.

The Request Headers indicate more information about the client such as the client's browser configuration, e.g., Microsoft Internet Explorer version 6.0 or Netscape Navigator version 6.2.1.

The Entity Headers indicate information about an entity (a document), which is about to be sent to the server. It might state the encoding scheme, the length, type, and origin of the document.

The Entity Body may contain data such as from a form filled out by the user for the server to process, such as name value pairs for a CGI program.

HTTP responses have the following components:

The first line of the response indicates the version of HTTP the server is using, the status code indicates the result of the request, and the reasons are the meaning of the status code, for example, status code 200 means OK (the client request is successful).

The General Headers have similar functions as in a client request so will typically have the current time and connection information.

The Response Headers tells the client of the server configuration, such as Apache 1.1.1. They may also contain cookies, which allow the server to store state information on the client.

The Entity Headers have similar functions as in a client request and may include the Last Modified Date of a given page.

The Entity Body may contain a requested page, a document, a script, or the resource requested.

FIG. 2 illustrates how HTTP provides a suitable framework for implementing client-side caching. Let's assume the user of a web application wants to change the background color of the pages in a web application. To do so the user might navigate to a preferences page and select a different background color from a drop down menu, and then press the submit button.

1. The browser may interpret this as requiring the POST method and transmit a request to the server, which tells it to update the user's background color preference and to return the preferences page with the desired color background.

2. The web server receives the POST request and passes a request to the application server. The application server will update the database with the user's background color preference and generate a small page including a cookie in the response header and script (such as a JavaScript function) in the entity body. Preferably, the small page will be less than 1 kilobyte so that it will quickly download from the server to the client, and will not be displayed in the browser. However, the size of the page and whether or not the browser displays the page are not essential to the invention.

The cookie is a small amount of named data, which will be stored in the web browser. Preferably, the application server invokes a servlet to create the cookie, set its value along with any optional attributes, and insert it into the response header of the small page. There is much literature on cookies. See e.g., U.S. Pat. No. 5,774,670 to Montulli, Netscape's preliminary specification on Cookies: *Persistent Client State HTTP Cookies* (1997), Hall, *Core Servlets and Java Server Pages* (2000) and Flanagan's *JavaScript: The Definitive Guide*, all of which are incorporated by reference.

In alternative embodiments, a cache control object replaces the cookie, and/or Internet or network protocols replace HTTP as the communication standards between the server and client to implement the invention. The cache control object is a small amount of data that can be set by the server and stored on the browser. The server can create new cache control objects or update the value of existing cache control objects on the browser by including directives in response to a browser request. The browser sends the cache control object back to the server when it makes requests to the server. Cache control objects can be accessed on the browser by scripts executed by the browser.

A servlet will assign a value to the cookie in the following manner. First, it will review the data used to generate all of the pages in the page class associated with the cookie. A page class is defined as a group of pages all need to be updated under the same conditions because they all depend on the same data. The cookie value is set to the most recent modification time for any data used by the page class. Pages that depend on slightly different sets of data may be combined into the same page class. In that case, the data for the page class is the union of the data sets for the pages. Taking the union of the data sets will cause the caching to be less efficient—in some cases an up-to-date page will be re-requested from the server—but it will reduce the number of cache control cookies that are required.

A servlet can also specify optional attributes of the cookie. For example, the servlet may specify the period of time for which the browser should store the cookie. In an embodiment, the servlet instructs the browser to maintain the cookie for a relatively long time such as one week. However, the lifetime of the cookie is not essential to the invention. It is preferred that it not be the default, however, because the cookie will be lost when the user exits the browser.

In addition to this attribute, a servlet can set the path of the cookie, which specifies the web pages with which the cookie will be associated. For example, the servlet can specify the path of the cookie so that any web page from the same web server that contains that path in its URL can share the cookie. In another embodiment, the path is not set and by default the cookie is associated with the web page that created it, and any other web pages in the same directory or subdirectories of that directory. If the host of the web application has multiple web servers, it may want to share the cookie across multiple web servers. The server can accomplish this by setting the domain attribute. If the domain attribute is not set for the cookie, the default is the hostname of the web server that serves the page.

3. After the browser receives the small page, the client will automatically execute a script embedded in the small page. The script appends the cookie value to the URL requested by the browser at step 1. The browser will automatically re-request the customized page with the rewritten URL. For example, if the initial request was for http://webapp.com/myPage.jsp, the rewritten request might be for http://webapp.com/myPage.jsp?cookie=value. The script may be implemented in JavaScript and embedded in an HTML document such as the following:

```
<html>
<head>
<meta HTTP-equiv='Content-Type' content='text/html; charset=iso-8859-1'>
<script language='JavaScript'>
function gc(name){var arg=name+'=';var i=0;
while (i < document.cookie.length){var j=i+arg.length;
if (document.cookie.substring(i, j)== arg){
var e=document.cookie.indexOf(';',j);
if (e==-1) e=document.cookie.length;
return unescape(document.cookie.substring(j,e));}
i=document.cookie.indexOf(' ',i)+1;
```

```
if (i==0) break;}return null;}
function redirectMe(url,cname) {
var lmtUrl=url+gc(cname);
if (document.forms[0].x.value=='g')
{document.forms[0].x.value='b';document.location.href =lmtUrl;}
else if (document.forms[0].x.value=='b')
{document.forms[0].x.value='f';history.back( );}
else {document.forms[0].x.value='b';history.forward( );}}
</script>
</head>
<body
onload="redirectMe('http://webapp.com/myPage.jsp?t=','T2');">
<form>
<input type='hidden' name='x' value='g'>
</form>
</body>
</html>
```

In this example, the script embedded in the page appends the value of a cookie named t2 to the URL http://webapp.com/myPage.jsp. The script also accounts for the fact that a user may wish to use the "back" and "forward" buttons built into the browser in order to skip to previously viewed pages and return back from previously viewed pages. Because this small page does not have viewable content, the script causes the browser to jump over it and continue to the previous page if the user arrives on this page by pressing the "back" button and to jump over it and continue to the next page if the user arrives on this page by pressing the "forward" button.

4. The server will receive the request, see that a cookie value is included, and respond with an HTML document, that is, the customized page (e.g., an 11 kilobytes page that the browser will display).

Figure 3:
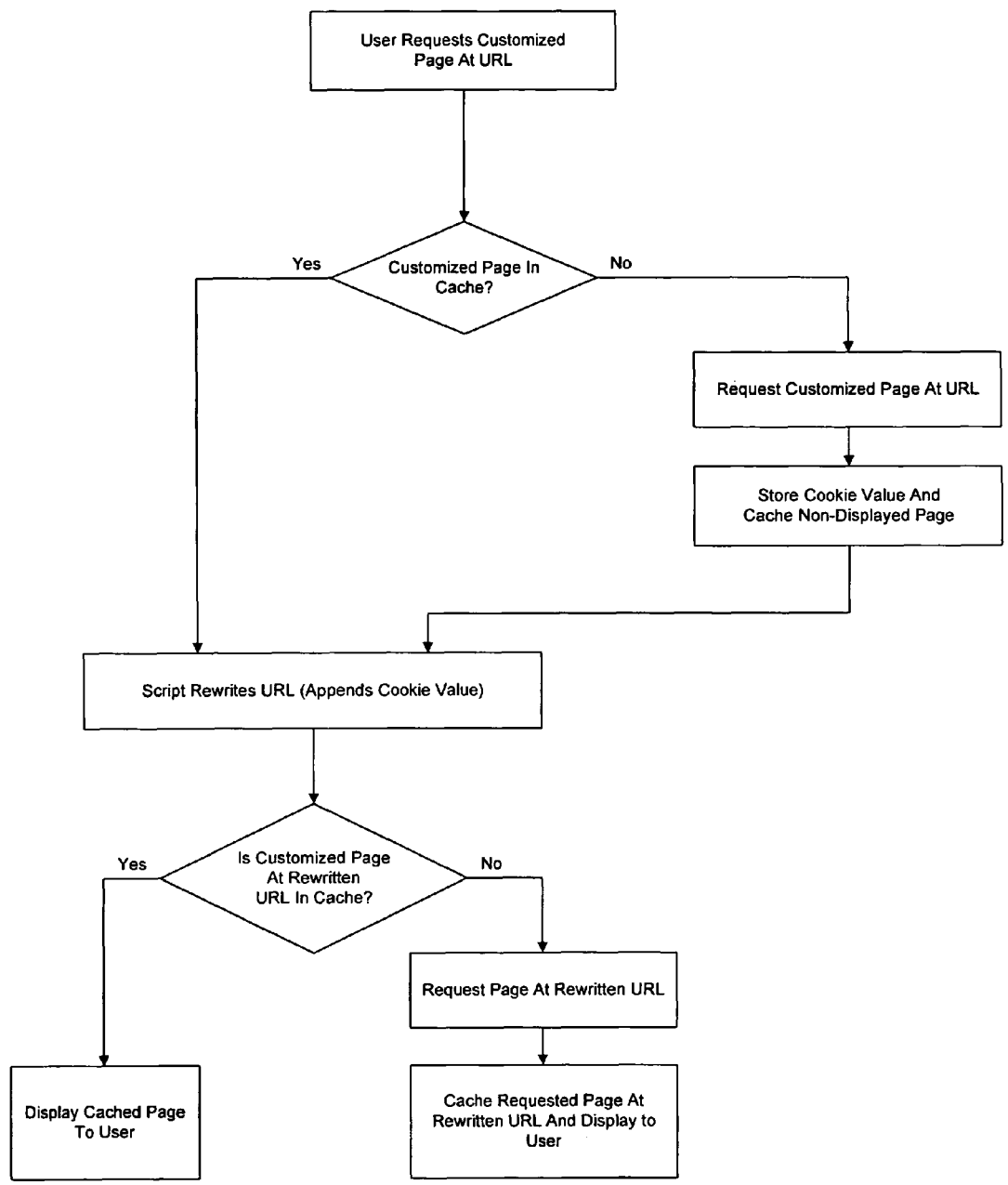
FIG. 3 illustrates a client-side program.

FIG. 3 illustrates one embodiment of client-side caching using a web browser. As shown in FIG. 3, the user requests a customized page at the URL. The browser will first compare the URL with the files in the browser cache to determine if the customized page can be retrieved locally. If the customized page is not found in the browser cache, the browser will automatically issue a GET request to the server for a customized page at the URL. If the server has previously set cookies on the browser, the cookies and their values will be sent as part of the request. The server will generate a response, which will preferably send a small non-displayed page containing JavaScript in the entity body. If cache control cookies have not been set or if the data they represent has been modified since they were set, the server will send cache control cookies as part of the response. The value of each cache control cookie will be the most recent modification time for any data in the page class represented by the cookie. After the JavaScript function is received in the browser, the function runs to rewrite the requested URL by appending the cookie value to the URL. It should be noted that this step is where the browser would be if the customized page was found in the browser cache. Next, the browser determines if the customized page with the rewritten URL is in the browser cache. If the browser has a cache hit, it displays the cached page to the user. If the browser has a cache miss, the browser issues a GET request to the server for the customized page with the rewritten URL, the server responds by sending down the requested page to the client and the requested page with the rewritten URL is stored in the browser cache and displayed to the user.

Figure 4:
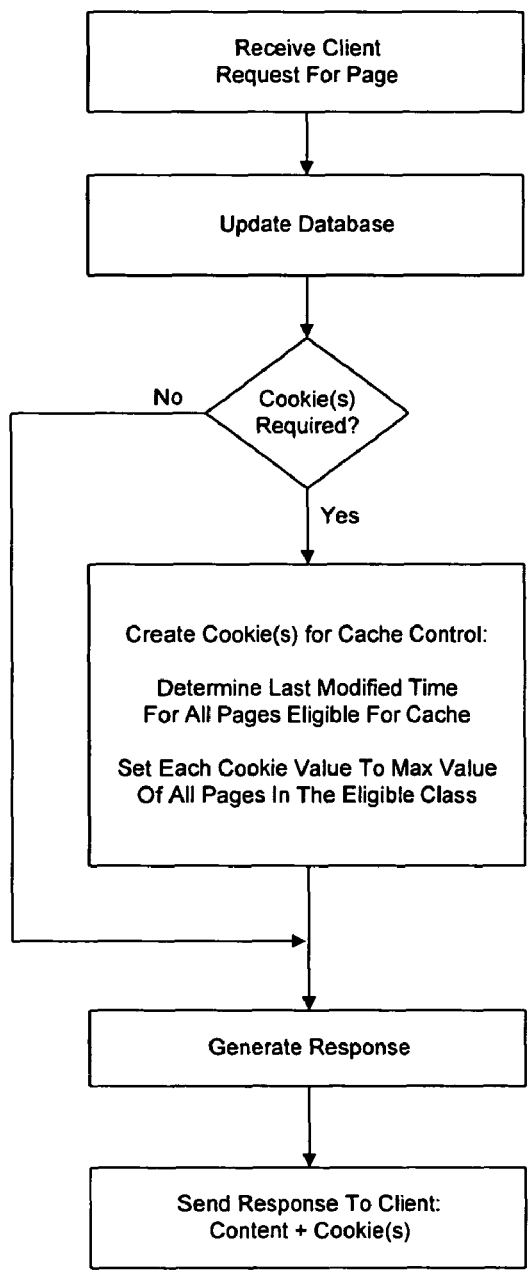
FIG. 4 illustrates a server-side program.

FIG. 4 illustrates an embodiment of the server, which can be implemented with the architecture shown in FIG. 1. The server will receive requests from clients on the Internet, update the database, for example, adding data or preferences from the user, and determine if cache control cookies have been set and are up-to-date on the browser. Next, the server generates a response or determines the cookie values for cache control and generates a response. In an embodiment, the server sets the cookie values by determining the most recent modification time for any data in the page class represented by the cookie. This ensures that a change to the data for any page in a given class is reflected in all pages in the same class. Finally, the server sends the response including the content and the cookies to the client.

Figure 5:
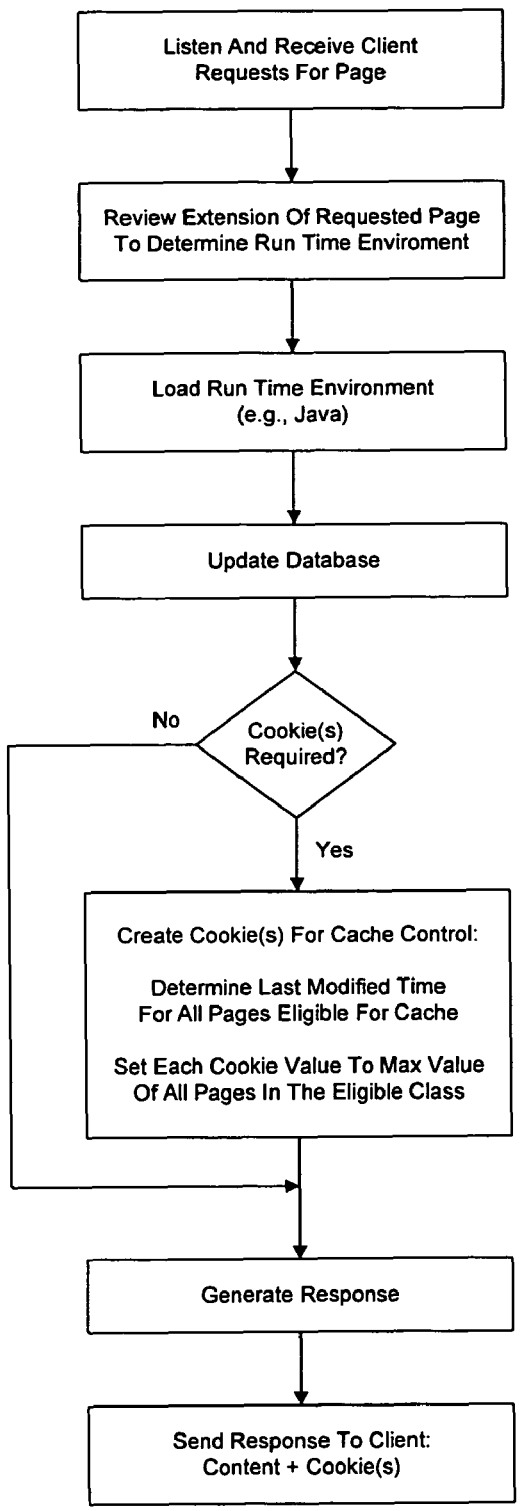
FIG. 5 illustrates another embodiment of a server-side program.

FIG. 5 illustrates another embodiment of the server, which can be implemented with the architecture shown in FIG. 1. A web server will listen and receive a client request for a page, review the extension of the requested page to determine the run time environment, and load any necessary run time environment. The server will update the database as discussed earlier. If the request does not require a cookie, for example, requests a static object such as a HTML page, the web server will send a response to the client such as might occur if the user needed, for example, mere confirmation of an action or that an improper request was made. If, on the other hand, the request requires one or more cache control cookies, the application server will create each cookie for cache control if the client does not already have one or update the client cookie(s) if it is outdated and then generate a response. The server can send the response with the cookie(s) and script and content to the client as described above.

The client-side cache can now pay off. First, if the user does nothing to change the customized page, future requests for the customized page will be serviced with two cache hits. The first cache hit retrieves the small page, which executes the script appending the cookie value to the request URL and the second cache hit occurs when the browser retrieves the content page from the browser cache.

If the user performs an action that will cause the content of a customized page to change so that it should not be retrieved from the client cache, the next server response will include a changed cache control cookie per step 2. The next time the user requests the customized page per step 1, the small page will be returned from the cache, the JavaScript function will again execute so the new cookie value will be appended to the URL, and the new version of the customized page will be retrieved from the server. The customized page in the cache will be ignored.

If a cookie is already stored on the browser and a server response contains a new value for the same cookie, the new value will overwrite the previous value, so the browser will always store the most recently set version of the cookie. In addition, although there may be many pages in the application, it may be desirable to only apply client-side caching to a subset of the pages. The less often the contents of a page changes, the greater the benefit of client-side caching. If a page changes regularly, there will be less benefit from client-side caching because the client will need to go back to the server to retrieve each new version. Finally, the preferred embodiment does not require the user to install special software on the client computer. Instead, it can make use of the caching and scripting mechanisms built in standard web browsers.

What is claimed is:

1. A client-side caching system, comprising:
  a client for issuing a request based on a user selection for a resource on a server; and
  a server for receiving the request and sending a response including a cache control object and a client-side script to the client, wherein the cache control object represents the last version of the resource, and wherein the client-side script appends the cache control object to the request for the resource and causes the client to automatically re-request the resource with the appended cache control object so that if the last version of the resource is in the client cache, the resource is retrieved from the client cache rather than from the server, and if not, the resource is retrieved from the server.

2. The client-side caching system of claim 1, wherein the resource is a web page, the resource is located at a URL, and the client is a web browser with a browser cache.

3. The client-side caching system of claim 2, wherein the server sets the cache control object by determining the last modified time of each web page in the same class as the web page which is the subject of the request, and sets the cache control object to the maximum value of the last modified times.

4. The client-side caching system of claim 1, wherein the response includes a non-displayed relatively small page and the cache control object is in a response header and the client-side script is in the entity body of the response.

5. The client-side caching system of claim 1, wherein the client-side script that appends the cache control object to the request is embedded in a displayed page.

6. A server for a client-side caching system, comprising:
a server for receiving a client request for a resource, creating and inserting a cache control object and a client-side script in a response to the client request, wherein the cache control object represents the last version of the resource, and wherein the client-side script appends the cache control object to the client request for the resource and causes the client to automatically re-request the resource with the appended cache control object so that if the last version of the resource is in the client cache, the resource is retrieved from the client cache rather than from the server, and if not, the resource is retrieved from the server.

7. The server of claim 6, wherein the server includes a web server for listening to client requests, the resource is a web page at a URL, and the client-side script appends the cache control object to the URL of the web page requested to form a rewritten URL and causes the client to automatically re-request the resource with the rewritten URL, and an application server for creating the cache control object and inserting the cache control object into a response header and inserting the client-side script into the entity body of the response.

8. The server of claim 6, wherein the serve sets the cache control object by determining the last modified time of each web page in the same class as the web page which is the subject of the request, and sets the cache control object to the maximum value of the last modified times.

9. A client-side caching system, comprising:
a client for issuing a request based on a user selection for a resource stored on a server and for receiving a server response including a cache control object and a client-side script, wherein the cache control object represents the correct version of the resource, and wherein the client-side script appends the cache control object to the request for the resource, and without another user selection for the resource causes the client to automatically re-request the resource with the appended cache control object so that if the correct version of the resource is in the client cache, the resource is retrieved from the client cache rather than from the server, and if not, the resource is retrieved from the server.

10. The client-side caching system of claim 9, wherein the resource, is a web page located at a URL, the correct version is the last version of the resource, and the client is a web browser with a browser cache.

11. The client-side caching system of claim 10, wherein the request and the response are HTTP compliant, the response is a relatively small non-displayed page, the cache control object is a cookie in a response header, and the client-side script is in the entity body of the response.

12. The client-side caching system of claim 11, wherein the server sets the cookie by determining the last modified time of each page in the same class as the page which is the subject of the request, and sets the cookie to the maximum value of the last modified times.

13. The client-side caching system of claim 9, wherein the client-side script that appends the cache control object to the request is embedded in a displayed page.

14. The client-side caching system of claim 9, wherein internet protocols define communication between the client and the server, and the correct version is the last version of the resource.

15. A method of client-side caching in a server, comprising:
receiving a client request for a web page; and
inserting a cache control object and a client-side script in response to the client request, wherein the cache control object represents the last version of the web page, and wherein the client-side script appends the cache control object to the client request for the web page and causes the client to automatically re-request the web page with the appended cache control object so that if the last version of the web page is in the client cache, the web page is retrieved from the client cache rather than from the server, and if not, the web page is retrieved from the server.

16. The method of claim 15, further comprising determining the last modified time of each web page in the same class as the web page which is the subject of the request, and setting the cache control object to the maximum value of the last modified times.

17. The method of claim 15, further comprising:
reviewing the extension of the requested web page to determine a run time environment;
loading the run time environment; and
updating a database with information from the client request.

18. A method of client-side caching in a browser, comprising:
presenting a user selection for a web page at a URL; and
receiving a server response including a cache control object and a client-side script, wherein the cache control object represents the most recent version of the web page, and wherein the client-side script appends the cache control object value to the URL generating a rewritten URL and causes the browser to automatically re-request the web page with the rewritten URL so that if the most recent version of the web page is in the browser cache, the web page is retrieved from the browser cache, and if not, the web page is retrieved from the server.

19. A method performed in a server to implement client-side caching, comprising:
receiving a request from a web browser with a cache based on a user selection for a web page located at a URL on the server; and
sending a response including a cache control object and a client-side script to the web browser, wherein the cache control object value represents the last version of the web page, and wherein the client-side script appends the cache control object value to the URL of the requested web page to form a rewritten URL and causes the web browser to automatically re-request the web page using the rewritten URL so that if the last version of the web page is in the web browser cache, the web page is retrieved from the web browser cache rather than from the server, and if not, the web page is retrieved from the server.

20. The method of claim 19, wherein the client-side script causes the web browser to automatically re-request the web page without another user selection.

21. The method of claim 19, wherein the response includes a non-displayed relatively small page and the cache control object is in a response header and the client side script is in the entity body of the response.

22. The method of claim 19, wherein the client-side script that appends the cache control object value to the request is embedded in a displayed page.

* * * * *